United States Patent [19]
Freitas et al.

[11] Patent Number: 6,105,099
[45] Date of Patent: Aug. 15, 2000

[54] METHOD FOR SYNCHRONIZING USE OF DUAL AND SOLO LOCKING FOR TWO COMPETING PROCESSORS RESPONSIVE TO MEMBERSHIP CHANGES

[75] Inventors: Richard Francis Freitas, San Martin; Divyesh Jadav, Campbell; Deepak Kenchammana-Hosekote, Sunnyvale; Jaishankar Moothedath Menon; Hovey Raymond Strong, Jr., both of San Jose, all of Calif.

[73] Assignee: International Business Machines Corporation, Armonk, N.Y.

[21] Appl. No.: 09/203,102

[22] Filed: Nov. 30, 1998

[51] Int. Cl.$^7$ .............................. G06F 12/00; G06F 12/14
[52] U.S. Cl. .............................. 710/200; 710/1; 710/244; 370/256; 370/231; 709/102; 709/106; 709/213; 709/214
[58] Field of Search ................................ 710/1, 200, 244; 709/213, 102, 214, 106, 248, 400; 370/256, 231; 714/10, 12

[56] References Cited

U.S. PATENT DOCUMENTS

| | | | |
|---|---|---|---|
| 4,604,694 | 8/1986 | Hough | 364/200 |
| 4,864,559 | 9/1989 | Perlman | 370/60 |
| 5,161,227 | 11/1992 | Dias et al. | 709/300 |

(List continued on next page.)

OTHER PUBLICATIONS

R. J. Anderson et al., "Wait–free Parallel Alogrithms for the Union–Find Problem", Proceedings 23$^{th}$ ACM STOC., 1991, pp. 370–380.

Bernstein et al., *Concurrency Control and Recovery in Database Systems*, Chapters 7.3–7.4, pp. 222–240.

T. D. Chandra et al., "On the Impossibility of Group Membership", ACM 1996, p. 322.

T. D. Chandra,. "Polylog Randomized Wait–Free Consensus", Proceedings of 15$^{th}$ ACM Symposium on Principles of Distributed Computing, 1996, pp. 166–175.

T. D. Chandra et al., "Unreliable Failure Detectors for Asynchronous Systems", Proceedings of 10$^{th}$ ACM Symposium on Principles of Distributed Computing, 1991, pp. 325–340.

S. Chaudhuri et al., "Understanding the Set Consensus Partial Order Using the Borowsky–Gafni Simulation", Proceedings of 10$^{th}$ International Workshop on Distributed Algorithms, Italy, 1996, pp. 362–379.

(List continued on next page.)

*Primary Examiner*—Glenn A. Auve
*Assistant Examiner*—Rupal D. Dharia
*Attorney, Agent, or Firm*—Dan Hubert & Assoc.

[57] ABSTRACT

To satisfy host requests, two competing processors self-manage access to a shared resource. Each processor maintains a lock table listing that processor's access state regarding the shared resource. Each processor repeatedly sends the other processor a state announcement message representing the processor's state. These include birth cry, heartbeat, or death knell messages. Whenever certain join-entry conditions apply to a processor, the processor performs a JOIN operation to evaluate and attempt to synchronize its lock table with the other processor's lock table. If data is needed from the other processor's lock table, the processor changes its state announcement message to birth cry. If the processor successfully synchronizes its lock table with the other processor, the JOIN operation dictates DUAL mode for that processor. If the synchronization attempt fails, SOLO results. When JOIN completes, the processor operates in its chosen mode. In DUAL, the processor's state announcement message is heartbeat, signifying healthy operation. In DUAL, the processors cooperatively establish temporary single-processor locks on the shared resource to satisfy host requests. In SOLO, a processor sets its state announcement message to death knell, advising the other processor not to access the shared resource. Also in SOLO, the processor attempts to "acquire" the shared resource by storing a predetermined identifier thereon. In SOLO, a processor refrains from accessing the shared resource unless it has acquired it.

54 Claims, 7 Drawing Sheets

U.S. PATENT DOCUMENTS

| | | |
|---|---|---|
| 5,202,971 | 4/1993 | Henson et al. .............................. 707/8 |
| 5,243,596 | 9/1993 | Port et al. ............................... 370/94.1 |
| 5,263,161 | 11/1993 | Barth et al. ............................. 395/650 |
| 5,276,818 | 1/1994 | Okazawa et al. ....................... 710/114 |
| 5,339,443 | 8/1994 | Lockwood ............................... 395/725 |
| 5,392,433 | 2/1995 | Hammersley et al. ................. 395/725 |
| 5,463,733 | 10/1995 | Forman et al. ..................... 395/182.08 |
| 5,502,840 | 3/1996 | Barton .................................... 395/726 |
| 5,513,354 | 4/1996 | Dwork et al. ........................... 395/650 |
| 5,577,261 | 11/1996 | Harinarayan et al. .................. 395/800 |
| 5,613,139 | 3/1997 | Brady ..................................... 710/200 |
| 5,623,670 | 4/1997 | Bohannon et al. ..................... 395/726 |
| 5,630,140 | 5/1997 | Modiri et al. .......................... 395/726 |
| 5,682,470 | 10/1997 | Dwork et al. ....................... 395/182.1 |
| 5,729,749 | 3/1998 | Ito ........................................... 395/726 |
| 5,732,241 | 3/1998 | Chan ....................................... 711/131 |
| 5,758,075 | 5/1998 | Graziano et al. ....................... 709/250 |

OTHER PUBLICATIONS

D. Dolev et al., "A Framework of Partitionable Membership Service", ACM 1996, p. 343 and 1–15.

D. Dolev et al., "Efficient Message Ordering in Dynamic Networks", 15th Annual ACM Symposium on Principles of Distributed Computing, 1996, pp. 68–76.

C. Dwork et al., "Collective Consistency", LN in CS 1151 WDAG Proceedings 1996, p. 234.

C. Dwork et al., "Collective Consistency (Work in Progress)," ACM 1996, p. 341.

S. Fakhouri et al., "Processor Group Membership Protocols: Specification, Design and Implementation", 12th Symposium on Reliable Distributed Systems, Oct. 1993, pp. 1–11.

B. Hajek et al., "The Time Complexity of Maximum Matching by Simulated Annealing", Journal of the Association for Computing Machinery, vol. 35, No. 2, Apr. 1988, pp. 387–403.

B. W. Lampson, "How to Build a Highly Available System Using Consensus", 10th International Workshop—Distributed Algorithms, Italy, 1996, pp. 1–17.

G. Neiger, "A New Look at Membership Services", ACM 1996, p. 331.

J. D. Palmer et al, U.S. Patent Application No. 08/972,111, entitled "Method and Apparatus for Ordered Reliable Multicast With Asymmetric Safety in a Multiprocessing System", filed Nov. 17, 1997, pp. 1–42.

A. Ricciardi, "Impossibility of (Repeated) Reliable Broadcast", ACM 1996, p. 342.

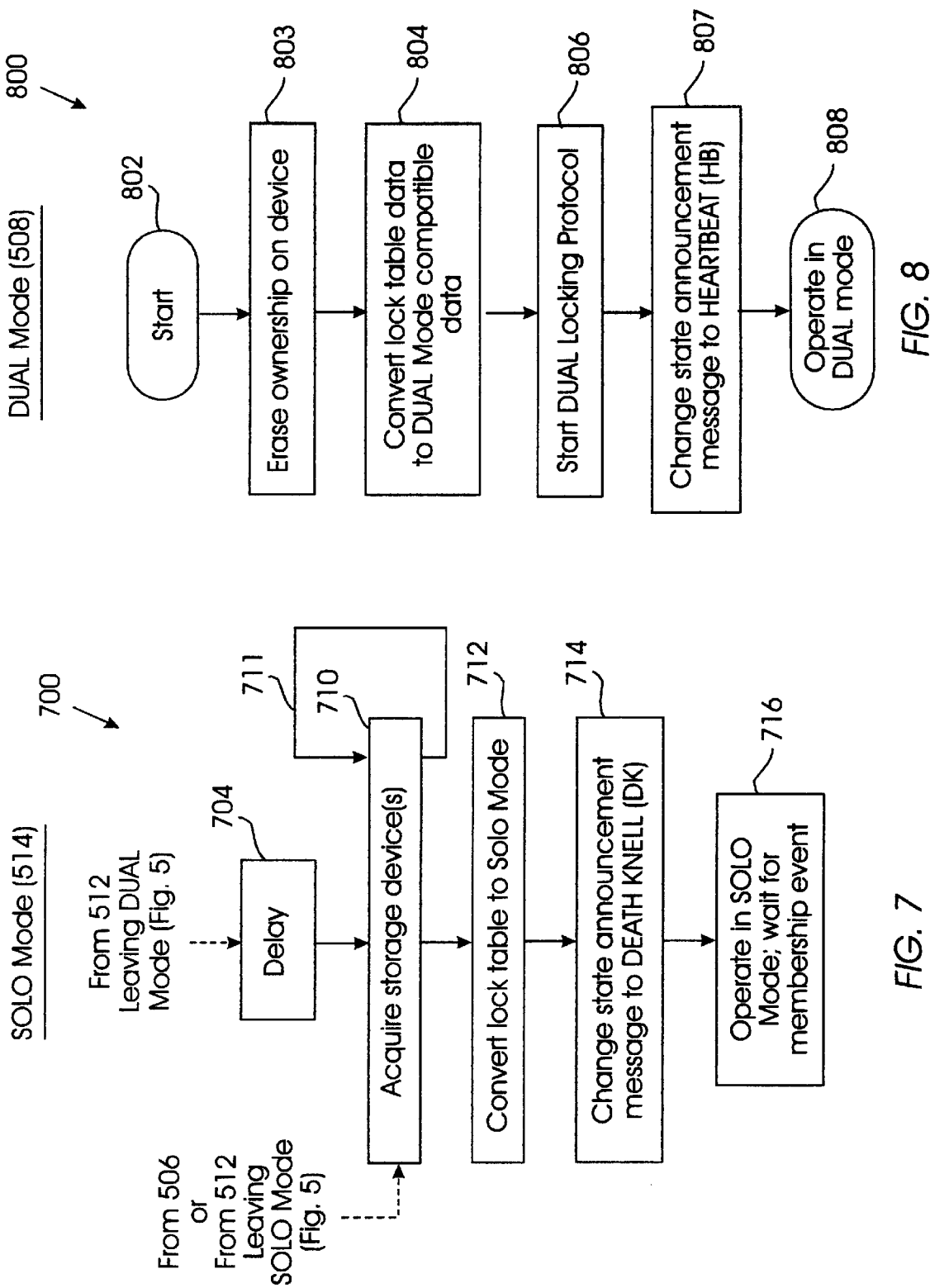

METHOD FOR SYNCHRONIZING USE OF DUAL AND SOLO LOCKING FOR TWO COMPETING PROCESSORS RESPONSIVE TO MEMBERSHIP CHANGES

BACKGROUND OF THE INVENTION

1. Field of the Invention

The present invention relates to computer systems with multiple processors. More particularly, the invention concerns a method for managing access to a shared resource among two competing processors.

2. Description of the Related Art

Today people are confronted with an astonishing amount of electronic information to manage. Such management involves transmitting, receiving, processing, and storing electronic data. To meet these challenges, many people choose computer systems with multiple processors. These systems can provide significant computing power by using numerous computers, microprocessors, processing threads, or other processing engines. These processors may also be known by terms such as processing units, processing elements, etc.

One recurring challenge to systems with multiple processors involves the sharing of resources among the multiple processors. As one example, digital data storage such as magnetic "hard" disk drive storage is often shared by multiple storage "adapters." Sharing such a resource is challenging because of the difficulties in arbitrating access to the resource. At any given time, which processor should be permitted access to the shared resource? Should other processors be given limited concurrent access? This is further complicated by the need to plan for possible failure of a processor or communications between the processors.

One popular approach to sharing computer resources is called "mutual exclusion," which is often applied at the device level. With this approach, processors access the resource one-at-a-time. While one processor is accessing the resource, all other processors are excluded from that device. Although this approach is attractive in its simplicity, shared computer resources often possess significantly more input/output ("I/O") capability than the processors that manage them. In this case, the full throughput of the shared resource is wasted when it is being used by one processor to the exclusion of the other processors.

In the case of storage resources, the system takes longer to store and retrieve data when the processors are confined by one-at-a-time access rules. This is undesirable because slower data storage and retrieval is usually frustrating to most computer users, and makes a storage system less competitive in the market. Furthermore, slow data access may be intolerable in certain data-critical applications, such as automated teller networks, airline reservation systems, stock brokerage, etc.

Consequently, mutual exclusion and other similar strategies for arbitrating processor access to shared resources are not completely adequate for some applications due to various unsolved problems.

SUMMARY OF THE INVENTION

Broadly, the present invention concerns a method and apparatus for managing access to a shared resource among two competing processors. Each processor is coupled to the shared resource as well as one or more hosts. Each processor separately maintains a lock table that lists that processor's state regarding the shared resource or subparts thereof. In a DUAL mode, the processors keep complementary lock tables when both processors are operating; in a SOLO mode, a processor uses its own lock table independent of the other processor to show which shared resources that processor has claimed exclusively.

While operating, each processor repeatedly sends a state announcement message to the other processor. A processor's state is represented by its recurring state announcement message, which comprises a birth cry (BC), heartbeat (HB), or death knell (DK) message.

Whenever certain join-entry conditions apply to a processor (the "current" processor), the processor enters a JOIN mode to choose an operating mode for itself. In the JOIN mode, the processor attempts to exchange any needed information to synchronize its lock table with the lock table of the "other" processor. This information may, for example, be out of date because the processor was not operational for some period due to a failure. If information is needed from the other processor's lock table, this means that the processor may have been down due to power off or failure. Accordingly, the processor changes its recurrent state announcement message to a birth cry message. The remaining cases are where both processors need to exchange information, or where the other processor requires information from the current processor.

If the current processor's attempt to synchronize its lock table with the other processor succeeds, the current processor chooses to operate in the DUAL mode. If the synchronization attempt fails, the current processor chooses a SOLO mode.

When the JOIN mode completes, the processor operates in its chosen mode, i.e., DUAL or SOLO. While in DUAL mode, the processor sets its state announcement message to heartbeat. This message tells the other processor that the current processor is running properly. In DUAL mode, the processors cooperatively establish temporary single-processor locks on subparts of the shared resource as needed to satisfy host requests to access the shared resource.

In contrast, if SOLO is the chosen mode, the processor enters SOLO mode after completion of JOIN. SOLO mode may also begin from DUAL (instead of JOIN) if one processor learns that the other processor has failed, e.g., by failing to receive the other processor's heartbeat message. In SOLO mode, the current processor changes its state announcement message to death knell, advising the other processor to refrain from accessing the shared resource. In SOLO mode, the processor performs an acquisition operation where it attempts to "acquire" subparts of the shared resource. During acquisition, the processor attempts to store a predetermined code at all subparts of the shared resource. Each subpart where the code is successfully stored is "acquired." Later, while still in the SOLO mode, when the processor receives a host request to access a shared resource subpart, the processor first determines whether it has acquired that subpart. If so, it accesses that subpart to the exclusion of the other processor without needing to consult that processor.

When a SOLO mode processor receives a birth cry message, the processor enters the JOIN mode, giving both processors a chance to eventually enter DUAL mode.

Accordingly, in one embodiment the invention may be implemented to provide a method to manage access to a shared resource among two competing processors. In another embodiment, the invention may be implemented to provide an apparatus, such as an adapter or other processor in a system with multiple processors, programmed to participate in the foregoing management of shared resource access. In still another embodiment, the invention may be implemented to provide a signal-bearing medium tangibly embodying a program of machine-readable instructions executable by a digital data processing apparatus to perform a method for managing access to a shared resource among two competing processors.

The invention affords its users with a number of distinct advantages. First, the invention makes better use of high-throughput shared resources by more efficiently sharing the resources among hierarchically superior hosts. In the data storage environment, for example, the invention is capable of storing and retrieving data more quickly. As a result, computer users are more pleased with their systems, since they operate more quickly. The invention is especially beneficial for the common configuration where two competing adapters or other processors share access to a common resource such as a digital data storage. The invention also provides a number of other advantages and benefits, which should be apparent from the following description of the invention.

BRIEF DESCRIPTION OF THE DRAWINGS

FIG. 7 is a flowchart depicting operation of a processor in the SOLO mode according to the invention.

FIG. 8 is a flowchart depicting operation of a processor in the DUAL mode according to the invention.

DETAILED DESCRIPTION

The nature, objectives, and advantages of the invention will become more apparent to those skilled in the art after considering the following detailed description in connection with the accompanying drawings. As mentioned above, the invention concerns the management of access to a shared resource among two competing processors.

HARDWARE COMPONENTS & INTERCONNECTIONS

Multiple-Processor System

Figure 1A:
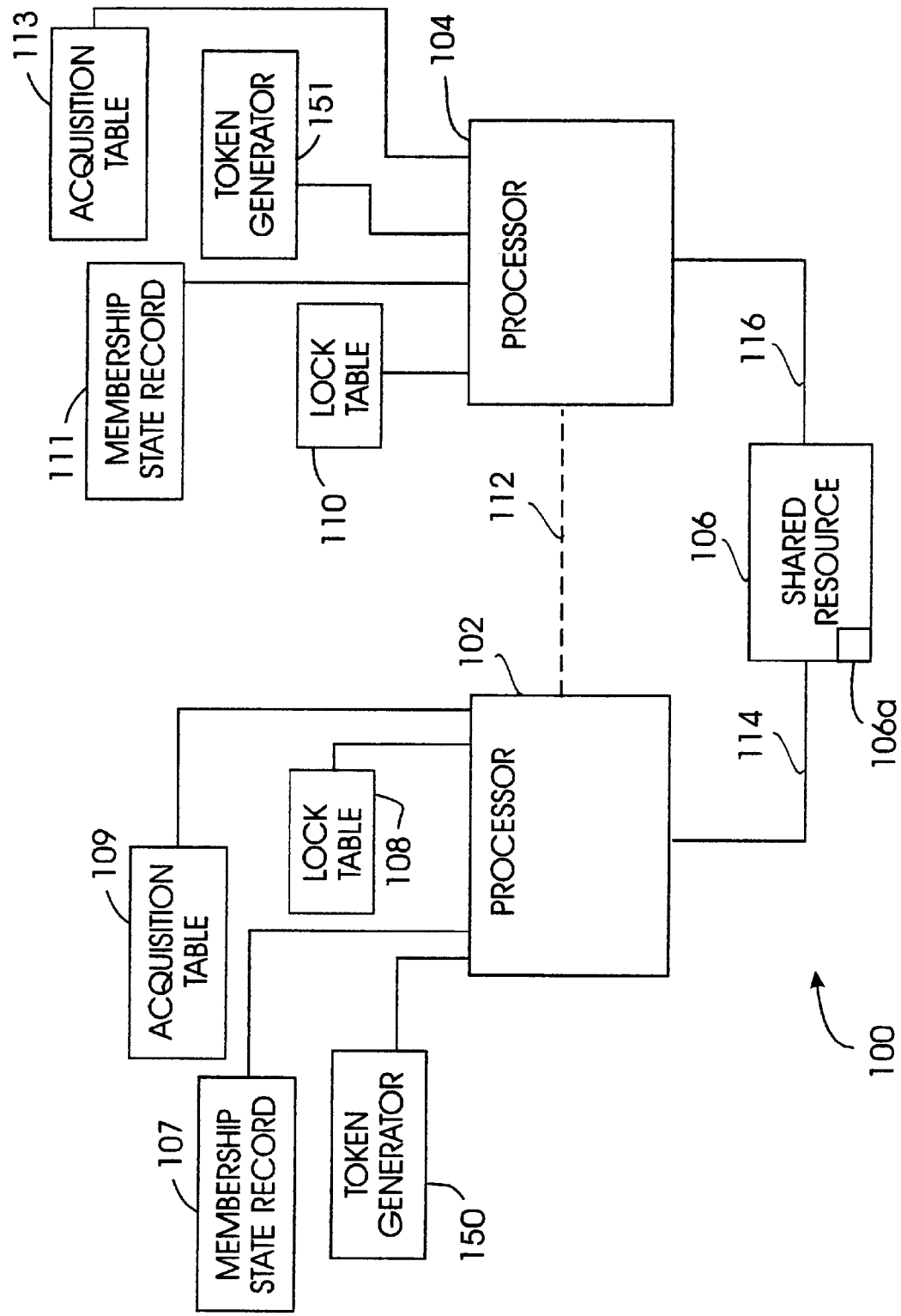
FIG. 1A is a block diagram of the hardware components and interconnections of a system with multiple processors in accordance with the invention.

One aspect of the invention concerns a system with multiple processors, which may be embodied by various hardware components and interconnections as shown by the system 100 of FIG. 1. The system 100 includes two processors 102, 104 and a shared resource 106. The processors 102, 104 may be provided by hardware constructs (e.g., microprocessors, supercomputers, mainframe computers, computer workstations, personal computers, or other suitable digital data processing machines), software (e.g., processes, processing threads, software programs, subroutines, firmware, etc.), or a combination of hardware and software.

The shared resource 106 may comprise any machine with storage, computing power, or another machine-accessible resource that is divisible into different subparts. As shown below, one example is a digital data storage, divisible into different storage addresses, ranges of addresses, address extents, logical devices, etc.

The processors 102, 104 exchange machine-readable messages with the shared resource 106 over respective communications links 114, 116. Inter-processor communication occurs over a communication link 112. The links 112, 114, 116 may be embodied by one or more cables, wires, backplanes, motherboards, fiber optic lines, infrared links, telephone lines, intelligent communications channels, electromagnetic or other wireless links, computer networks (such as Internet, Intranet, wide area network, local area network, etc.), or another suitable mechanism for exchanging machine-readable messages. As an example of many alternative arrangements, the link 112 may be eliminated completely with the links 114, 116 being additionally interconnected to provide a link between the two processors 102, 104. As another approach, the links 114,116 may be eliminated with the resource 106 coupled to the link 112. Ordinarily skilled artisans (having the benefit of this disclosure) may recognize of variety of other approaches as well.

Each processor 102, 104 exclusively maintains a respective lock table 108, 110. The lock tables 108, 110 are contained in storage accessible by the processors 102, 104, which may be provided by one or more nonvolatile storage devices such as battery backed RAM memories, magnetic disk drives, optical tapes, optical disks, magnetic tapes, paper punch cards, or other suitable machine-accessible storage. As explained further below, each processor maintains in association with its lock table a queue of shared resource requests that are awaiting execution by that processor. For each subpart of the shared resource, the processors 102, 104 exchange certain messages to decide which processor will have exclusive access to that subpart.

Each processor 102, 104 also includes or otherwise has exclusive access to a respective token generator 150, 151. Each token generator 150, 151 comprises a mechanism to generate a code, which is used to increase the system's tolerance of lost messages. As discussed below, each message exchanged between the processors 102, 104 includes a token. New messages include a new token of the originating processor, whereas messages responding to a previous message must carry that previous message's token to associate the two messages and thereby be effective.

In the present example, the token generators provide tokens that are binary numbers. Thus, the token generators 150, 151 may comprise respective registers, memory addresses, counters, etc. A token is generated in this example by incrementing a token generator. Each of the token generators 150, 151 provides a new token after one of its tokens is used or "grabbed." For instance, if the processor 102 obtains ("grabs") a token from its respective token generator 151, the token generator 151 then proceeds to generate a new token.

In the illustrated example, tokens of the token generators 150, 151 are non-overlapping. In other words, the tokens of each token generator never match any tokens provided by the other generator. If binary number tokens are used, this feature may be provided by ensuring that one token generator's most significant bit is always zero, whereas the other token generator's most significant bit is always one.

Another feature of the token generators is that they rarely, if ever, repeat the same token. As an example, this feature may be provided by using binary generators with a sufficiently high number of bits (e.g., thirty-two bits). A repeat cycle of about one year may be used successfully in many cases.

In addition to the token generators 150, 151 and lock tables 108, 110, each processor has its own acquisition table 109, 113 and membership state record 107, 111. A processor uses its acquisition table when the adapter is operating in the SOLO mode, which is discussed in greater detail below. While in SOLO mode, a processor tries to acquire the shared resource 106 by storing a predetermined code (such as a unique adapter identifier code) at the shared resource, such as in a predetermined code storage region 106a. When there are many shared resources, or many shared resource subparts, the processor tries to acquire as many shared resources as possible with this technique. The processor uses its acquisition table to keep track of which shared resources (or subparts) it has acquired. Table 1 (below) shows an example, where there are many shared resource subparts, some of which have been acquired and others not.

TABLE 1

Acquisition Table

| SHARED RESOURCE SUBPART | ACQUIRED? |
|---|---|
| logical device 0001 | Yes |
| logical device 0002 | Yes |
| logical device 0003 | Yes |
| logical device 0004 | Yes |
| logical device 0005 | No |
| logical device 0006 | No |
| logical device 0007 | No |

The acquisition tables 109, 113 may be implemented in many different ways, such as storage registers, tables, flags, etc.

Each membership state indicator shows the corresponding processor's current state. As shown below, a processor may be operating in one of the following modes: DUAL, SOLO, JOIN, or DOWN. The SOLO mode has the sub-modes including PRELUDE TO SOLO, ACQUISITION, and ACTIVE SOLO. The JOIN mode has the sub-states including SYNC, MERGE, and PRELUDE TO DUAL. Table 2 (below) shows an exemplary membership state indicator.

TABLE 2

Membership State Record

| CURRENT STATE | POSSIBLE STATES |
|---|---|
| DUAL | dual |
|  | down |
|  | solo: prelude to solo |
|  | solo: acquisition |
|  | solo: active solo |
|  | join: sync |
|  | join: merge |
|  | join: prelude to dual |

The membership state records 107, 111 may be implemented in many different ways, such as storage registers, storage bytes, flags, numeric codes, alphanumeric codes, etc.

Example: Storage System

Figure 1B:
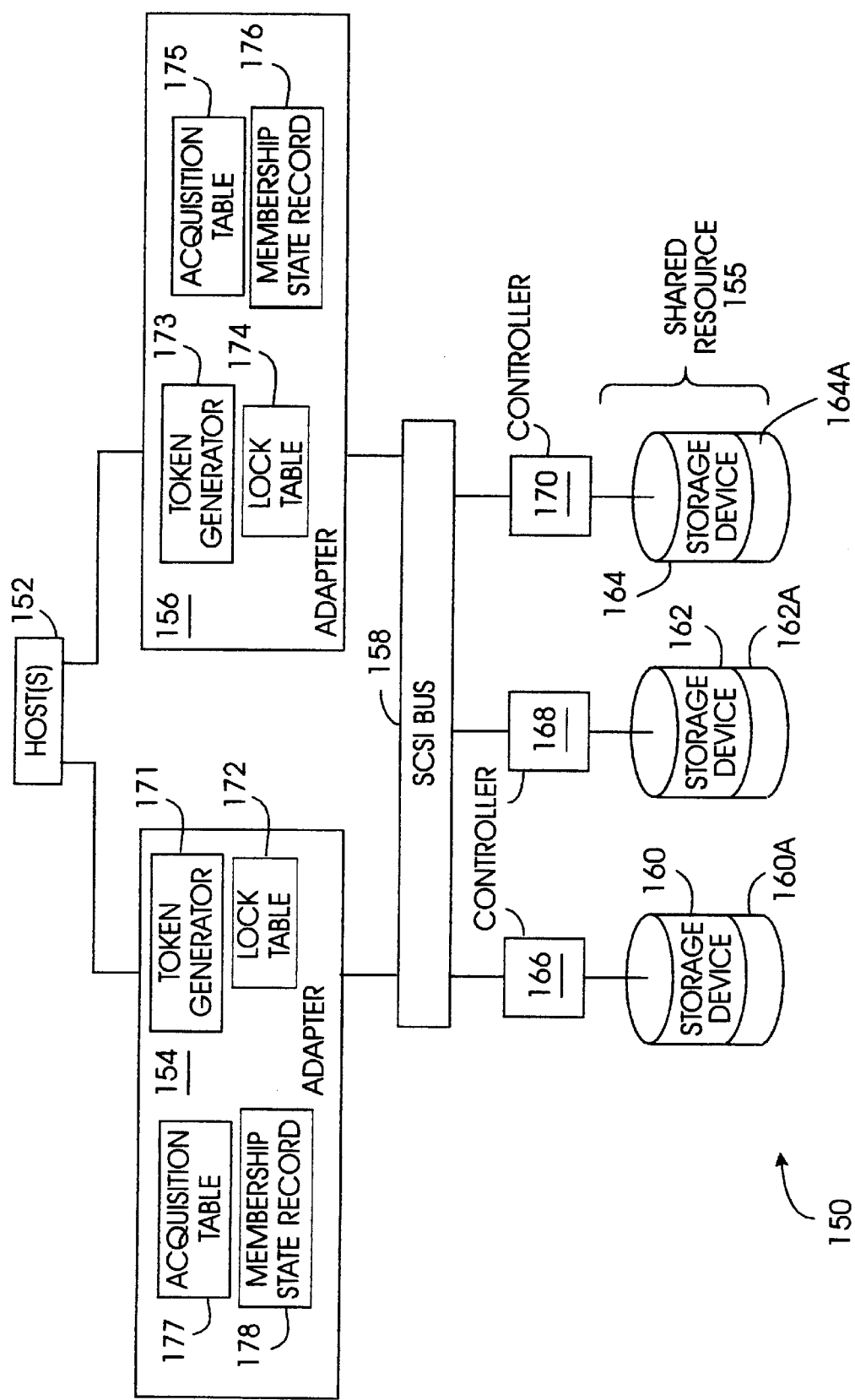
FIG. 1B is a block diagram of a digital data storage system employing synchronized dual and solo locking in accordance with the invention.

FIG. 1B depicts a more particular example of the multiple processor system of the invention, in the form of a digital data storage system 150, in which the shared resource comprises digital data storage. In this example, each lock table contains a respective queue of requests that are awaiting execution by the lock table's processor. In the DUAL mode, the processors 102,104 exchange certain messages to decide which processor will have exclusive access to each subpart of the shared resource The system 150 includes two processors embodied by storage adapters 154, 156. The adapters 154, 156 are coupled to a shared resource 155 and one or more hosts 152. The adapters 154, 156 may be coupled to the same host(s), completely different hosts, or a mix of common and distinct hosts. In one example, the adapters 154, 156 may comprise printed circuit boards physically and electrically mounted within the host(s) 152. As an even more specific example, the adapters 154,156 may comprise IBM model ServeRAID II adapters.

In this example, each adapter 154, 156 houses a respective lock table 172, 174, stored in nonvolatile storage aboard the adapter. The nonvolatile storage may comprise, for example, RAM with battery backed power. The lock tables 172, 174 may comprise tables, linked lists, ASCII text, or another data structure suitable for storing information of the type discussed below.

Each adapter also includes a respective token generator 171,173. The structure and operation of the token generators 171, 173 may resemble the token generators 150, 151 discussed above.

The shared resource 155 comprises some or all of one or more digital data storage devices. Such devices may include magnetic disk drives, optical tapes, optical disks, magnetic tapes, paper punch cards, or other suitable machine-accessible storage. A specific example is an IBM brand RAMAC disk drive storage subsystem. The shared resource 155 is divisible into "subparts," such as physical devices, logical devices, addresses, address ranges, address extents, cylinders, sectors, tracks, or other units. In the present example, the shared resource 155 is illustrated by multiple storage devices 160, 162, 164, managed by respective device controllers 166, 168, 170. The storage devices include respective code storage regions 160a, 162a, 164a for use in SOLO mode acquisition of the devices by the adapters 154,156. Namely, when an adapter is in SOLO mode, the adapter will try to acquire the storage devices 160, 162, 164 by storing a predetermined code (such as a unique adapter identifier code) at the shared resource, in a prescribed region such as the code storage regions 160a, 162a, 164a.

A bus 158 is coupled to the controllers 166, 168, 170 and the adapters 154, 156. In this example, the bus 158 comprises a small computer standard interface ("SCSI") bus, and carries communications between the adapters and the storage controllers, as well as between the adapters.

Exemplary Digital Data Processing Apparatus

Another aspect of the invention concerns a digital data processing apparatus, which may be used to implement one of the competing processors 102–104 (FIG. 1A) or one of the competing adapters 154–156 (FIG. 1B), or a subcomponent thereof. This apparatus may be embodied by various hardware components and interconnections.

Figure 2:
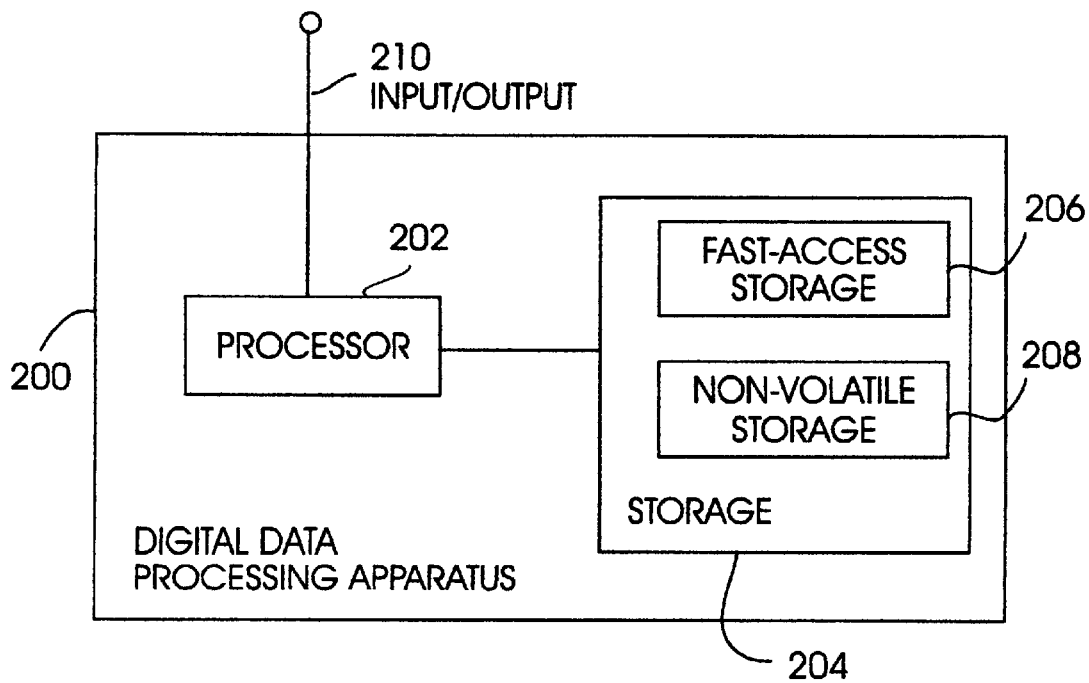
FIG. 2 is a block diagram of a digital data processing machine in accordance with the invention.

FIG. 2 shows an example of one digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise RAM, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the various hardware embodiments described above, a different aspect of the invention concerns a method for managing access to a shared resource among two competing processors.

Signal-Bearinq Media

In the context of FIGS. 1B and 2, for example, such a method may be implemented, for example, by operating each of the adapters 154, 156 (as embodied by a digital data processing apparatus 200) to execute a respective sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to manage access to a shared resource in cooperation with a competing processor.

Figure 3:
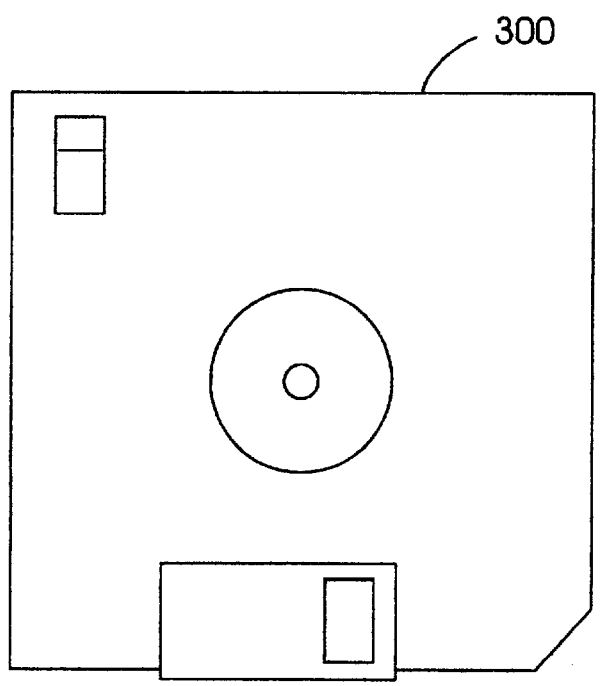
FIG. 3 shows an exemplary signal-bearing medium according to the invention.

This signal-bearing media may comprise, for example, RAM (not shown) contained within the adapter 154, 156 (FIG. 1B), as represented by the fast-access storage 206 (FIG. 2). Alternatively, the instructions may be contained in another signal-bearing media, such as a magnetic data storage diskette 300 (FIG. 3), directly or indirectly accessible by an adapter 154, 156. Whether contained in the diskette 300, the adapters 154, 156 themselves, or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Overview of Operation

Figure 5:
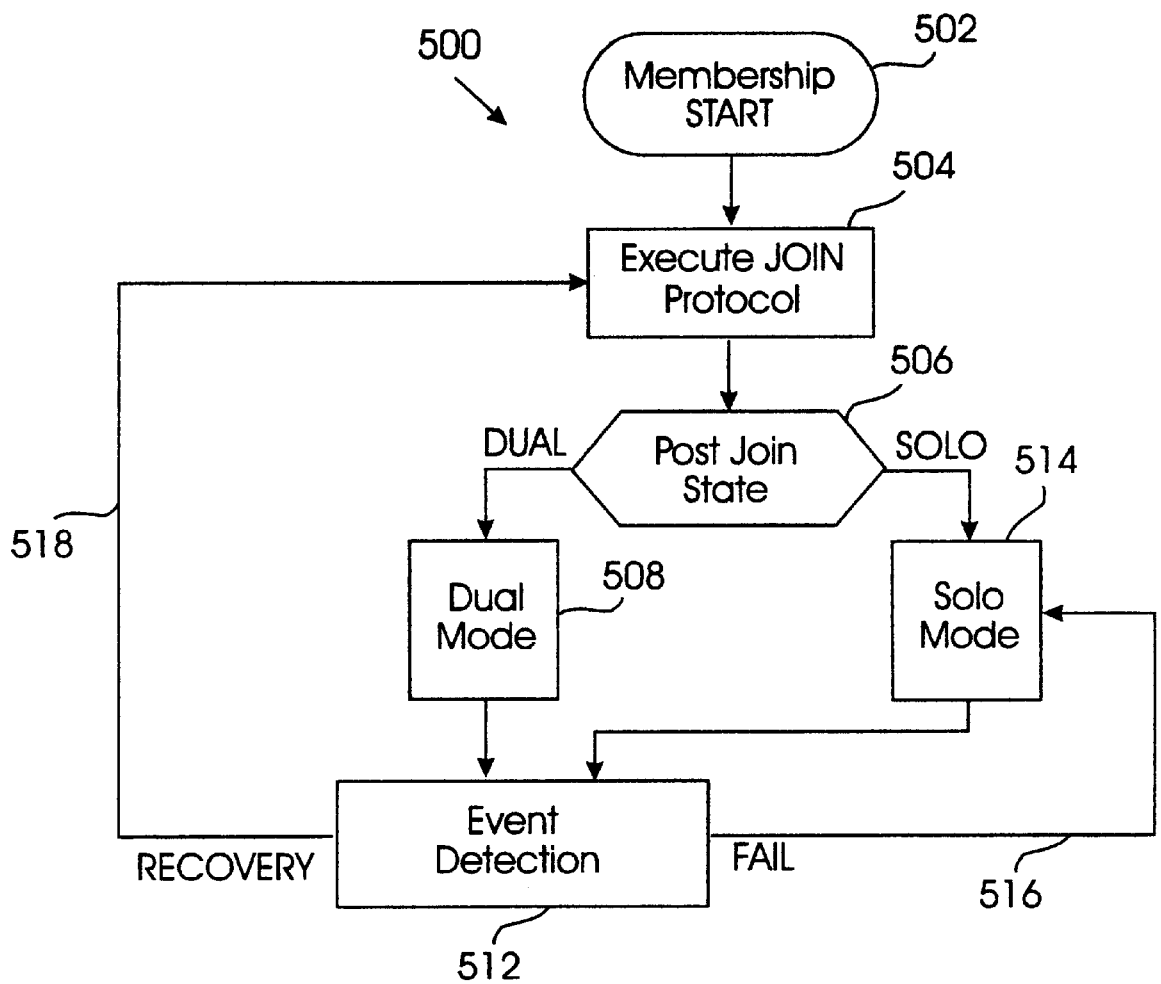
FIG. 5 is a flowchart depicting an overall membership sequence performed by one processor in a dual processor system with shared access to a common resource.

FIG. 5 shows a sequence 500 to provide an overall description of the method aspect of the present invention. For ease of explanation, but without any intended limitation, the example of FIG. 5 is described in the context of the hardware environment of FIG. 1B, described above. Each adapter 154, 156 separately performs the sequence 500, and by doing so, the adapters 154, 156 cooperatively manage the shared resource 155. For ease of explanation, the sequence 500 is described as being performed by the adapter 154, which is called the "current" adapter. The other adapter 156 is referred to as the "other" adapter.

The current adapter 154 begins the sequence 500 in step 502, which occurs when the adapter 154 receives power, boots up, or otherwise restarts from a DOWN mode as discussed below. After step 502, the current adapter 154 begins the JOIN protocol, also called a JOIN mode 504. The details of the JOIN mode 504 are discussed below. In the JOIN mode 504, the adapters attempt to synchronize their lock tables so that both adapters can later cooperatively operate in a DUAL mode. Alternatively, if DUAL mode operation is not possible, then the current adapter must operate in the SOLO mode.

After the JOIN mode 504, step 506 examines the current adapter's chosen mode resulting from the JOIN mode. If this mode is DUAL, then step 508 is performed. In the DUAL mode, both adapters 154, 156 cooperatively manage access to the shared resource 155. In response to access requests from the hosts, the processors exchange various messages to cooperatively elect a single processor to have exclusive access (i.e., a "lock") to the shared resource subparts involved in the access requests. After one adapter is elected, the lock-holding adapter configures its lock table to show the identified subpart in a LOCAL state, and the non-lock-holding adapter configures its lock table to show the identified subpart in the REMOTE state. In DUAL mode operation, the adapter owning a lock that has been granted is the "local" adapter, and the non-owning adapter is the "remote" adapter. The adapter owning the lock has exclusive access to the shared resource, on behalf of itself or as a conduit for its attached host(s). Thus, rather than replicating one lock table for all adapters, the adapters separately maintain lock tables that are coordinated with each other. Importantly, each adapter voluntarily refrains from accessing a subpart of the shared resource unless the adapter's lock table indicates a LOCAL state for that subpart.

In contrast to DUAL mode operation 508, if the current adapter's post-join mode is SOLO, then the adapter operates in the SOLO mode 514. In this mode, communications with the other adapter are not established, preventing reliable DUAL mode operations. In step 514, the current adapter attempts to "acquire" as many parts of the shared resource 155 as possible. SOLO modes is unlike the DUAL mode, where ownership of shared resource subparts is resolved by inter-adapter communications to request and obtain locks. Namely, in SOLO mode acquisition, the current adapter attempts to store a predetermined adapter identifier code upon the shared resource, thereby establishing an exclusive claim to the resource.

Operation in DUAL mode (step 508) or SOLO mode (step 514) continues until a "membership event" is detected. Membership events involve recovery or failure of the other adapter. If the membership event is a recovery, the current adapter begins the JOIN mode 504 (via path 518), in an attempt to have both adapters running in the DUAL mode. If the membership event is a failure, the current adapter operates in the SOLO mode 514 via path 516.

State Announcement Messages

As described in greater detail below, each operating adapter repeatedly sends the other adapter a state announcement message. These messages help the adapters operate most advantageously together. The state announcement messages include heartbeat (HB), death knell (DK), and birth cry (BC) messages. Sending of the state announcement messages may occur periodically, semi-periodically, according to a predetermined schedule, in response to certain conditions, or on another sufficiently frequent basis. The content of these messages may be any code that is uniquely identifiable due to content (numeric, alphanumeric, alphabetic, or other), time of broadcast, length, frequency, modulation, or any other distinguishable feature.

The current adapter sends the heartbeat message to tell the other adapter that the current adapter is operational. The current adapter sends this message when it is operating in the DUAL mode 508. The current adapter sends the death knell message to advise the other adapter to refrain from accessing the shared resource. This message is sent when the current adapter is in the SOLO mode 514. The current adapter sends the birth cry message after having failed or powered down, in order to prompt the other adapter's entry into the JOIN mode, so that the adapters might possibly enter the DUAL mode together. The birth cry message also prompts the other adapter to send data from its lock table to help the current adapter become current.

Use of Lock Tables

According to the invention, each processor maintains a lock table with multiple entries, each entry corresponding to a subpart of the shared resource. In the storage example (FIG. 1B), the shared resource subparts vary in size, and may comprise addresses, address extents, logical devices, physical devices, cylinders, tracks, etc. In the illustrated example, each lock table entry concerns one address range of the shared storage.

In association with each address range, a lock table lists the address range's "lock state" for the lock-table-owning adapter. Each adapter has a certain lock state for each different address range. As explained below, an adapter's lock state may vary from subpart to subpart. Also, the two adapters 154,156 may have the same or a different lock state regarding the same address range. An adapter's lock table may list a shared resource subpart in one of the following lock states:

1. FREE—No lock is presently granted to any adapter (DUAL mode), or the current adapter has not acquired the subpart (SOLO mode).

2. LOCAL—A lock has been granted for use by the current adapter (DUAL mode), or the adapter has acquired the subpart (SOLO mode). The LOCAL state may be further divided into various sub-states if desired.

3. REMOTE—(DUAL mode only)—The lock has been granted to the other adapter.

The REMOTE state may be further divided into various sub-states if desired.

4. REQ—(DUAL mode only)—The LOCAL adapter has a request in progress to the REMOTE adapter for the lock on this shared resource subpart.

In the DUAL mode, the adapters exchange various "messages," and the hosts send "inputs" to the adapters. Adapters also self-generate certain "inputs." More specifically, the "messages" (adapter-to-adapter) include:

1. LRQ—This is a request filed by one adapter for a lock on the associated shared resource subpart.

2. LRL—This is a message returned by an adapter relinquishing its lock on a shared resource subpart.

3. LG—This is a message returned by one adapter agreeing that the other adapter can have the lock, thereby affirmatively completing the other adapter's lock request (LRQ).

There are also various "inputs," which arise externally from an attached host and/or internally from the adapter itself in both DUAL and SOLO modes. These input include:

1. OP—This is a host lock request from a host seeking access to a specified subpart of the shared resource. The receipt of this input signifies the very first step in the process of an adapter obtaining a lock on a subpart.

2. DONE—This input is received by an adapter (1) from an attached host when the host is finished using the locked address range of the shared resource, or (2) from the adapter itself, when the adapter has finished processing an ABORT input, as discussed below.

3. ABORT—This self-generated input occurs when a "timeout" associated with a lock occurs, as discussed below.

As explained below, each adapter's lock table includes a queue for each shared resource subpart. The queues are used to serialize the processing of the inputs and certain messages applicable to that address range, from the standpoint of the adapter associated with that queue. Certain occurrences constitute "stimuli," which cause an adapter to emerge from a "wait" processing state and take certain action. These include:

1. Arrival of a host lock request (OP) input.

2. A host lock request input (OP) input arriving at the head of the queue.

3. Arrival of a lock request (LRQ) message.

4. A lock request (LRQ) message arriving at the head of the queue.

5. Arrival of a lock grant (LG) message.

6. Arrival of a lock release (LRL) message.

7. Receipt of a DONE input.

8. Receipt of an ABORT input.

Lock Table Format

Table 3 (below) shows the various components of an exemplary lock table associated with one adapter. As shown in Table 3, the lock table contains one row for each address range (i.e., shared resource subpart), with each row listing the lock state, current token, and pending queue for that address range.

TABLE 3

Exemplary Lock Table

| ADDRESS RANGE [X] | LOCK STATE [STATE(X)] | CURRENT TOKEN [CURRENT(X)] | QUEUE [QUEUE(X)] |
|---|---|---|---|
| A1: 0–1024 bytes | LOCAL | Y1 | (LRQ, A1, Wi) |
| A2: 1025–2048 bytes | FREE | none | (OP, A2, 0) |
| A3: 2049–4096 bytes | LOCAL | Y2 | (OP, A3, Y2), (OP, A3, 0) |
| A4: 4096–5120 bytes | REMOTE | W2 | (OP, A4, Y3) |
| A5: 5120–6144 bytes | REQ | Y4 | (OP, A5, Y4) |

The "lock state" column expresses the address range's lock state for the associated adapter, namely FREE, REMOTE, LOCAL, or REQ. The "current token" column shows a present "token" for the associated address range. As mentioned above, tokens may be instances of a sequential code, such as an alphabetic, alphanumeric, or numeric code. Generally, as explained in greater detail below, tokens are used to uniquely identify messages, for example to ensure that a lock grant (LG) is issued specifically in response to a particular lock request (LRQ). The "queue" column contains an ordered list of pending inputs and queued messages for the associated address range.

Operating Modes—Described by State Diagrams

Figure 4A:
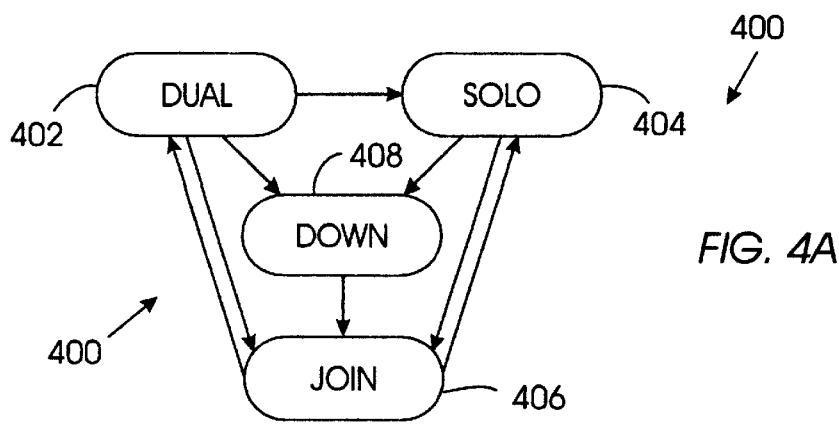
FIGS. 4A–4C depict state diagrams depicting various membership states and interrelated transitions utilized by two processors while accessing a shared resource, according to the invention.
Figure 4B:
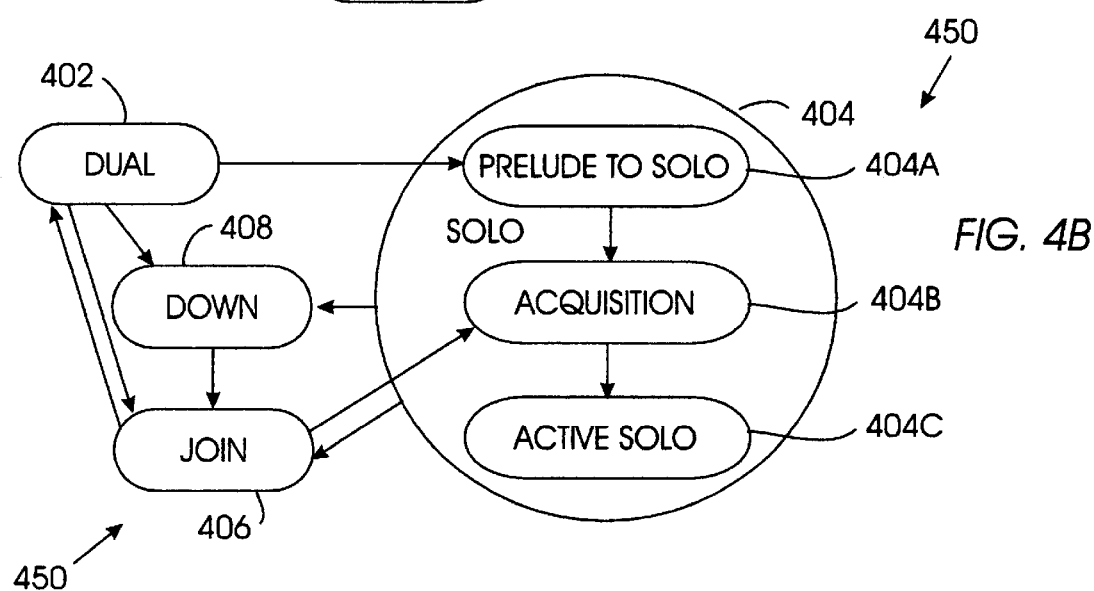
Figure 4C:
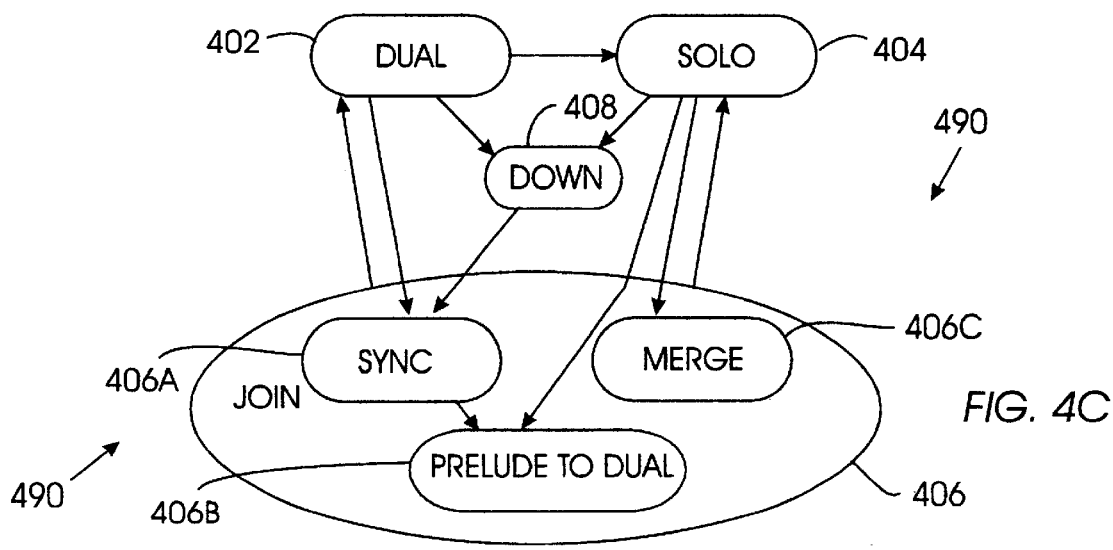

As explained above, operation of the adapters 154,156 occurs in JOIN, SOLO, and DUAL modes. The state diagrams in FIGS. 4A–4C illustrate these modes in greater detail. FIG. 4A depicts a state diagram 400 explaining the operation of each adapter generally, to compliment the description of FIG. 5 provided above. Each adapter operates under various membership modes and interrelated transitions while accessing the shared resource. Each of the modes may have various sub-modes, as discussed in greater detail below. The adapters store representations of their states (e.g., DUAL, SOLO, JOIN) in their respective membership state records 178, 176. Thus, when an adapter experiences a mode change, it changes the contents of its membership state record accordingly.

In FIG. 4A, DUAL mode operation is shown by 402, where both adapters cooperatively exchange locks on subparts of the shared resource. SOLO mode is shown in 404, where each operating adapter attempts to acquire subparts of the shared resource by placing its adapter identifier code in a prescribed code storage region on the shared resource. The JOIN mode is shown in 406, where one or both adapters are attempting to enter the DUAL mode 402. Additionally, a DOWN mode 408 is shown to depict the non-failure related inoperative state of an adapter, such as a "graceful" power off state.

When the current adapter is operating in DUAL 402 it transitions to SOLO 404 when it detects failure of the other adapter; this occurs when the current adapter stops receiving the other adapter's heartbeat. In contrast, the current adapter's transition from DUAL 402 to JOIN 406 occurs when the other adapter falsely detects the current adapter's failure and then initiates a JOIN; another instance is when the current adapter powers up directly into DUAL 402 after experiencing a power loss. A transition from DUAL 402 to DOWN 408 occurs as a result of an external shutdown command.

Similarly, when the current adapter is operating in SOLO 404, a transition to DOWN 408 occurs as a result of an external shutdown command. The current adapter changes from SOLO 404 to JOIN 406 when it detects recovery of the other adapter, by receiving a birth cry, heartbeat, or death knell message.

From JOIN 406, the current adapter enters DUAL 402 when the join protocol completes successfully, i.e., both adapters are operational and communicating properly. The join protocol guarantees that the adapters' lock tables are identical and all adapter identifier codes have been erased from the shared resource subparts before either adapter can enter the state DUAL. The JOIN mode is discussed in more detail below. In contrast, the current adapter enters SOLO 404 from JOIN 406 when it detects failure of the other adapter or the JOIN 406 does not complete within a prescribed maximum time limit, as discussed more below.

FIG. 4B is a state diagram 450 showing the state diagram 400 with the SOLO mode 404 depicted in greater detail. The SOLO mode 404 includes the sub-modes PRELUDE TO SOLO 404a, ACQUISITION 404b, and ACTIVE SOLO 404c. PRELUDE TO SOLO 404a is a holding state in which an adapter waits for a specified time before moving to the next SOLO state. In PRELUDE TO SOLO 404a, the current adapter waits for a specified time in case the entry into SOLO 404 was based on a false failure detection; in this case, the other adapter may be completing some input/output (I/O) operations, so the current adapter pauses to let any such operations complete.

In ACQUISITION 404b, the current adapter "acquires" as many subparts of the shared resource possible. In one implementation, a subpart may be "acquired" when the adapter successfully writes its adapter identifier code at that subpart. A more advanced approach may also be used, where the acquiring adapter must store its adapter identifier code at a quorum of storage subparts predesignated as "leaders" in order to access any of those leaders in SOLO mode. In this context, each lock is associated with portions of storage on a set of physical devices. Moreover, the entire universe of physical devices is partitioned into disjoint groups such that locks do not cross the partition boundaries. For each of these groups, a set of one or more leaders is chosen. A special level of access to a majority (quorum) of these leaders is required in order to update locks associated with any device in the group. In the simplest case, one leader is chosen for each group. The configuration of these groups is available as part of the nonvolatile storage at each replica.

When an adapter in SOLO discovers that the other adapter has already written its adapter identifier code to a shared resource subpart, the discovering adapter may not change the contents of that subpart until it completes a JOIN with the other adapter or the other adapter erases its adapter identifier code (e.g., in response to a shutdown command).

In ACTIVE SOLO 404c, the current adapter unilaterally manages all of the subparts that it has successfully acquired.

In SOLO 404, the concurrent granting of inconsistent locks is avoided by ensuring that subpart acquisition is atomic. The current adapter attempts to acquire a subpart by first searching for the other adapter's identifier code stored at the subpart, and then proceeding to acquire the subpart only if it is not already acquired by the other adapter. In DUAL mode 402, inconsistent locks are prevented by a locking protocol in which both replicas participate in lock table updates made in the DUAL mode 402, as discussed below.

The current adapter may only modify its lock table in DUAL 402, or in ACQUISITION 404b. In the DOWN mode 408, the current adapter's local lock table is empty, i.e., no locks are currently granted.

Only the adapter that has written the adapter identifier code stored at a shared resource subpart may erase it. The adapter identifier code must be erased before the adapter that wrote it can enter DUAL 402 or DOWN 408. Since the prevention of inconsistent lock grants depends on a guarantee that the two adapters do not both write their adapter identifier codes at the same device, there are two mechanisms for preventing this race condition. First, when an adapter enters the SOLO mode 404, it repeatedly sends a death knell message to the other adapter telling it to enter JOIN 406. This death knell message is sent periodically as long as the adapter is in SOLO mode with respect to any subpart (or group of subparts if any are defined).

Second, writing of an adapter identifier code is performed contingent on first reading the identifier storage region and verifying that no adapter identifier code is already stored there. In one example, the combination of read and contingent write may be performed atomically using a sequence of SCSI commands such as RESERVE-READ-(if OK) WRITE-RELEASE. There is a very small window of vulnerability in which a faulty reset of the bus (e.g., by a transient power failure) could allow each adapter to believe it had successfully written its adapter identifier code to the storage device. The coincidence of this transient power failure with the loss of a relevant death knell message is considered to be extremely unlikely. However, for additional safety, an adapter entering SOLO may be programmed to wait for two death knell periods and send two death knell messages before attempting to write its adapter identifier code.

Still referring to FIG. 4B, the DUAL mode 402 is discussed in more detail. The update (locking) protocol guarantees that the lock tables stay synchronized so that a lock may only be granted by one adapter at a time. As discussed below, the locking protocol is sufficiently robust to tolerate both message reordering and loss. Some desirable properties for a dual locking protocol are:

safety—no lock is granted concurrently by both adapters, and if a lock is in any state except REMOTE at an adapter then any operations on the subpart protected by the lock via the other adapter have completed successfully, preserving any local safety properties (e.g., consistency, parity, etc.).

liveness—eventual progress in granting locks is guaranteed, assuming timeouts on individual lock grants, or assuming eventual repeated requests for the lock.

fairness—each adapter makes eventual progress without starving the other.

efficiency—overhead is minimized for the case that one adapter has multiple requests for a lock while the other has none.

The DUAL mode 402 may be implemented using techniques that are known, new, or a combination thereof, as discussed in specific detail below.

FIG. 4C shows a state diagram 490 comprising the diagram 400 with the JOIN mode 406 depicted in greater detail. Here, JOIN 406 is implemented using three sub-modes: SYNC 406a, PRELUDE TO DUAL 406b, and MERGE 406c. In MERGE 406c, each adapter may have information needed by the other adapter to enter the DUAL 402. In SYNC 406a, the current adapter needs information from the other, but has no information needed by the other to enter DUAL 402. In PRELUDE TO DUAL 406b, the current adapter has all the information it needs, and is waiting for an acknowledgment for receipt of information it has sent the other adapter before entering DUAL 402.

More Detailed Explanation

With the foregoing background set forth, the following description illustrates a number of different operating sequences. Each sequence is performed by an adapter whenever that adapter receives certain stimuli. The adapters have like construction, and each is capable of performing any of the sequences, depending on the received stimulus. The following examples are discussed from the perspective of a "current" adapter that is performing the sequence, where the remaining adapter is called the "other" adapter.

The following discussion, with reference to FIGS. 5–8, describes a detailed embodiment to provide one example of the invention. Although the invention may be implemented with more adapters, the present example describes an especially valuable embodiment involving a system with managed access to shared digital storage among two possibly competing adapters.

Overall Operating Sequence

Although FIG. 5 was briefly described above, a more detailed description follows, which benefits from the foregoing explanation of FIGS. 4A–4C. As mentioned above, each adapter 154, 156 separately performs the sequence 500, and by doing so, the adapters 154, 156 cooperatively manage access to the shared resource 155.

Figure 6:
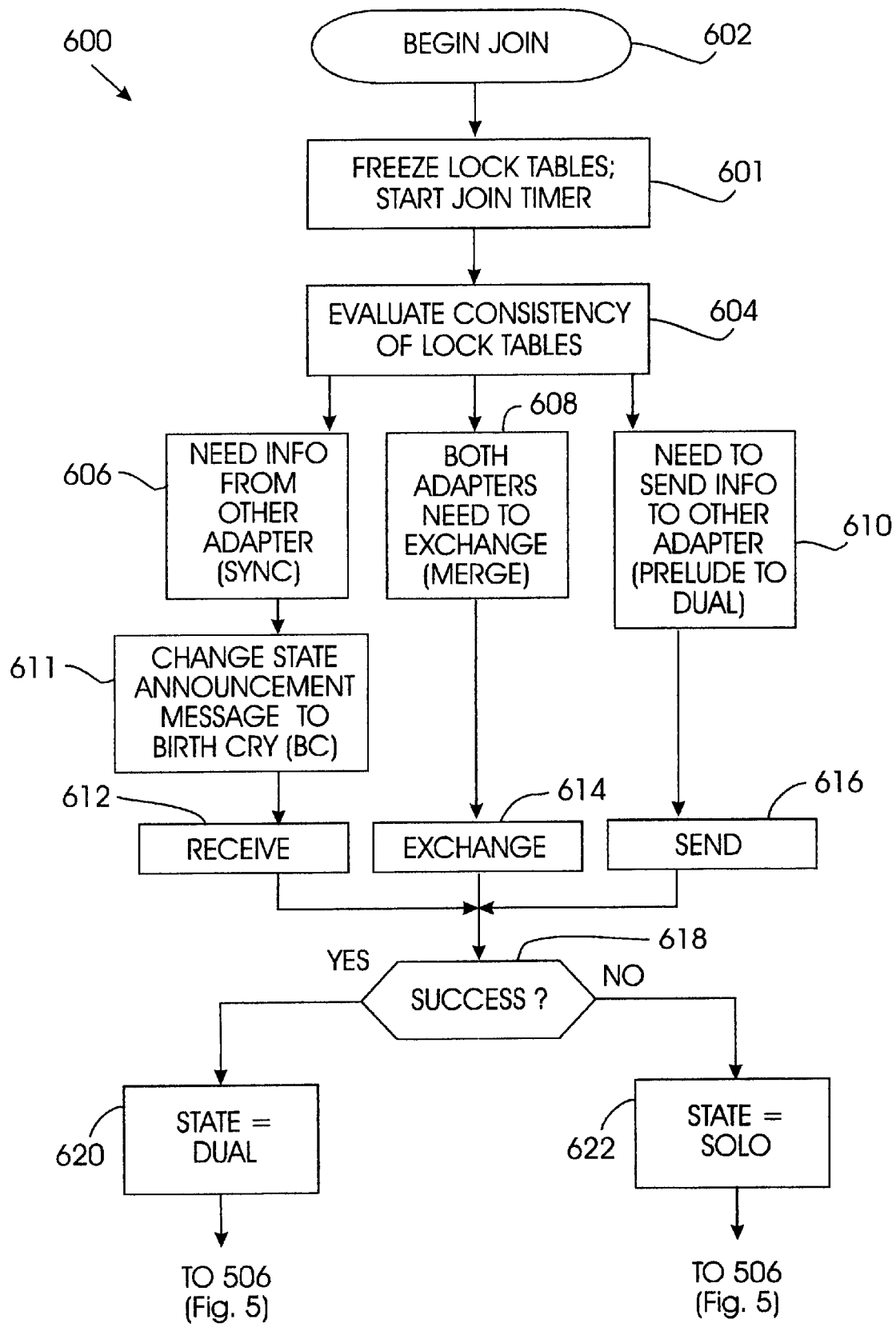
FIG. 6 is a flowchart depicting operation of a processor in the JOIN mode according to the invention.

The current adapter 154 begins the sequence 500 in step 502, which occurs when the adapter 154 receives power, boots up, or otherwise restarts from the DOWN mode (state 408, FIG. 4A). After step 502, the current adapter 154 begins the JOIN protocol, also called the JOIN mode 504. The JOIN mode 504 corresponds to the state 406 in the state diagram 400, discussed above. The JOIN mode 504 is also illustrated in greater detail below by the operations 600 (FIG. 6). In the JOIN mode 504, the current adapter attempts to synchronize with the other adapter in order to subsequently begin operation in the DUAL mode. As a result of the JOIN mode 504, the current adapter chooses to operate in either the SOLO or the DUAL mode.

After the JOIN mode 504, step 506 examines the current adapter's chosen operating mode resulting from the JOIN mode. If this state is DUAL, then step 508 is performed. In the DUAL mode, both adapters 154, 156 cooperatively manage access to the shared resource 155 by exchanging temporary locks on subparts as needed. The DUAL mode corresponds to the state 402 in the state diagram 400, discussed above. The DUAL mode 508 is also discussed in greater detail below by the operations 800 (FIG. 8).

In contrast, if the current adapter's post-join mode is SOLO, then the adapter operates in the SOLO mode 514. In this mode, communications with the other adapter are not established, preventing reliable DUAL mode operations. The SOLO mode 514 corresponds to the state 404 of the state diagram 400. The occurrences of SOLO mode 514 are explained in greater detail by the operations 700 (FIG. 7), described below.

Operation in DUAL mode 508 or SOLO mode 514 continues until a "membership event" is detected. As mentioned above, membership events involve recovery or failure of the other adapter. A recovery is indicated, for example, by receiving a heartbeat, birth cry, or death knell message from the other adapter. Failure is indicated, for example, by failure to receive the other adapter's heartbeat message during DUAL mode operation or by expiration of the join timer (discussed below) during JOIN mode operation.

With a recovery event, the current adapter begins the JOIN mode 504, in an attempt to start both adapters running in the DUAL mode. With a failure event, the current adapter operates in the SOLO mode 514.

JOIN Mode (Membership Protocol)

Referring to FIGS. 5–6, FIG. 6 shows an operating sequence 600 to illustrate the JOIN mode 504 in greater detail. The sequence 600 begins in step 602, which may occur under various circumstances. For example, initiation of the JOIN sequence 600 may result from the SOLO mode 514 (FIG. 5) when a membership event is detected (step 512) that signifies recovery of the other adapter. The other adapter's recovery may be indicated by a birth cry, heartbeat, or death knell message from the other adapter, for example.

Initiation of the JOIN sequence 600 may also result from the DUAL mode 508, where the other adapter falsely detects the current adapter's failure, then initiates JOIN by sending a death knell message. When the current adapter receives the other adapter's death knell message (while in DUAL), the current adapter initiates the JOIN sequence 600.

Another case where the JOIN sequence 600 may result from the DUAL mode 508 is where the current adapter first powers up after having lost power while in the DUAL mode. In this case, the adapter losing power starts up in the SYNC state 406a (FIG. 4C) of the JOIN mode. In contrast, if the current adapter is intentionally powered down, in a so-called "graceful" shutdown, the adapter enters the DOWN state 408 (FIG. 4A); later, when powered up, the adapter transitions from the DOWN state 408 to the SYNC state 406a of the JOIN mode.

After starting the JOIN mode in step 602, the current adapter freezes its lock table 172, thereby preventing any changes to the lock table. Also in step 602, the current adapter starts a join timer (not shown). The join timer signals when the JOIN process 600 fails to complete within a maximum, user-prescribed time. Expiration of the join timer without completion of the JOIN sequence 600 puts the current adapter in the SOLO mode 514.

Next, in step 604 the current adapter determines the consistency of its lock table with respect to the other adapter's lock table. As shown below, this is done based on historical events, rather than communicating with the other adapter to actually compare lock tables. More particularly, the current adapter determines whether it requires information (SYNC state 606), both adapters need to exchange information (MERGE state 608), or the other adapter needs information (PRELUDE TO DUAL state 610). This determination may be made as shown in Table 4, below.

Thus, step 604 leads to one of steps 606, 608, or 610. Step 606 corresponds to the SYNC state 406a (FIG. 4C). In this case, the current adapter changes its state announcement message to the birth cry message (step 611). This is done in order to initiate the other adapter's entry into the PRELUDE TO DUAL mode 610. Following step 611, the current adapter receives the necessary data from the other adapter's lock table (step 612).

Alternatively to step 606 (and steps 611–612), step 608 corresponds to the MERGE state 406c (FIG. 4C). In this case, the necessary two-way exchange is conducted in step 614. In this situation, the other adapter simultaneously enters the MERGE state 406c.

In contrast to the foregoing options, step 610 corresponds to the PRELUDE TO DUAL state 406b (FIG. 4C). In this case, the current adapter sends the necessary information in step 616. During this time, the other adapter is operating in the SYNC mode 606.

After any of steps 612, 614, or 616, the current adapter determines whether the necessary data exchange succeeded (step 618). If yes, then the current adapter sets its state to DUAL (step 620), and advances to DUAL mode operation 508 (FIG. 5) via the routing step 506 (FIG. 5). In contrast, if the needed information exchange did not succeed, then the current adapter sets its state to SOLO (step 622), and advances to SOLO mode operation 514 (FIG. 5) via the routing step 506 (FIG. 5).

TABLE 4

Evaluating Lock Table Consistency

| WHILE IN: | MESSAGE RECEIVED | THIS MEANS | ACTION PERFORMED |
|---|---|---|---|
| DUAL | heartbeat | the other adapter is operational, as expected | everything is okay, do nothing |
| DUAL | death knell | the other adapter has detected the current adapter's failure and is apparently operating SOLO | since the other adapter might have acquired subparts of the shared resource while in SOLO, the current adapter needs information from the other adapter's lock table; accordingly, enter SYNC 606 |
| DUAL | birth cry | the other adapter has failed and recovered before the current adapter even detected the failure | first approach: the other adapter has previously failed, and the current adapter might have obtained locks to parts of the shared resource while in DUAL mode; thus, the other adapter needs to copy the current adapter's lock table; accordingly, enter PRELUDE TO DUAL 610<br>second approach: stay in DUAL mode, taking advantage of inherent safety of dual locking protocol |
| SOLO | heartbeat | the other adapter is now operating after having failed | first approach: since the current adapter might have acquired subparts of the shared resource, it must provide data from its lock table to the other adapter; accordingly, enter SYNC 606<br>second approach: if the current adapter has not yet acquired any subparts of the shared resource, go directly to DUAL |
| SOLO | death knell | the other adapter, which is apparently operational, considers the current adapter to be failed | since both adapters have been operating SOLO, and each may have acquired parts of the shared resource, a mutual information exchange is needed: accordingly, enter MERGE 608 |
| SOLO | birth cry | the other adapter is now alive, after having failed | since the other adapter has previously failed, and the current adapter might have acquired parts of the shared resource while in SOLO mode, the other adapter needs to copy the current adapter's lock table; accordingly, enter PRELUDE TO DUAL 610 |

To more reliably determine whether steps 612, 614, and 616 have succeeded, the data exchange of steps 612, 614, 616 may be accompanied by message tokens, where counterpart messages require matching tokens. This helps ensure that each adapter actually receives and sends data that is expected.

SOLO Mode

FIG. 7 further illustrates the operation of the current adapter in the SOLO mode. SOLO mode operation involves a sequence 700 as illustrated. SOLO mode is initiated in response to step 506 as discussed above (FIG. 5). The way in which SOLO mode starts, however, depends on the mode in which the current adapter was previously operating. Namely, the sequence 700 starts in step 704 if SOLO mode is initiated due to failure of the other adapter while the current adapter was in the DUAL mode. In other words, the sequence 700 starts in step 704 if the current adapter was operating in DUAL mode 508, but entered SOLO mode (step 514) after detecting a failure of the other adapter (step 512). Step 704 represents the PRELUDE TO SOLO mode 404a (FIG. 4B).

Step 704 institutes a predetermined delay 704 before the current adapter takes further action. Since this entry to step 704 involves failure of the other adapter, step 704 permits the other adapter to finish any remaining I/O operations that may be in progress. This precaution considers the possibility that, although the other adapter may be failed from the standpoint of inter-adapter communications, it may still be executing I/O operations without any related problems in this aspect of its operation. Thus, step 704 permits these possibly-executing I/O operations to complete, thereby avoiding a device conflict between the two adapters.

In contrast, if SOLO mode is initiated after the JOIN mode (i.e., from step 506), or reinitiated due to failure of the other adapter while the current adapter was in the SOLO mode (i.e., from step 514 then 512), SOLO mode begins instep 710. Stated another way, the sequence 700 starts in step 710 if (1) the current adapter entered SOLO mode from step 506, or (2) the current adapter was operating in SOLO mode (step 514) and re-entered SOLO mode (step 514) after detecting a failure of the other adapter (step 512). Since the foregoing entries to the sequence 700 do not involve a previously operational but now failed other adapter, the delay 704 (to permit the other adapter to finish in-progress I/O operations) is unnecessary.

When the sequence 700 arrives at step 710, the current adapter begins to "acquire" as many subparts of the shared resource 155 as possible. In the hardware environment of FIG. 1B, step 710 is performed by the current adapter 154 attempting to acquire as many of the storage devices 160, 162, 164 as possible. This corresponds to the ACQUISITION mode 404b (FIG. 4B). As shown by 711, this process repeats until the current adapter attempts to acquire all devices, either successfully or not. The current adapter makes a record of each acquired device in its acquisition table 177.

After step 710 begins, the current adapter 154 modifies the data in its local lock table 172 to be compatible with the SOLO mode operation. This is done to eliminate DUAL mode specific items in the lock table. Specifically, step 712 involves the following conversions:

1. address ranges in the REQ state . . . >converted to LOCAL state.
2. address ranges in the REMOTE state . . . >converted to FREE state.
3. address ranges in the FREE state . . . >remain in the FREE state.
4. address ranges in the LOCAL state . . . >remain in the LOCAL state.

After step 712, the current adapter changes its state announcement message to the death knell message (step 714). This advises the other adapter that the current adapter is operating in the SOLO mode, and continually instructs the other adapter to refrain from accessing the shared resource 155.

After step 714, the current adapter starts operating in the SOLO mode (step 716). This corresponds to the ACTIVE SOLO mode 404c (FIG. 4B). In this mode, the current adapter enjoys unrestricted access to the storage devices that it acquired in step 710, to the exclusion of the other adapter. Also in step 716, the current adapter begins waiting for any membership events that occur. Possible membership events at this point include receiving a birth cry message, receiving a heartbeat message, or receiving a death knell message, each of which signals possible recovery of the other adapter.

DUAL Mode

FIG. 8 further illustrates the operation of the current adapter in the DUAL mode. DUAL mode operation involves a sequence 800 as illustrated. The sequence 800 begins in step 802; step 802 is initiated in response to step 506 (FIG. 5) as discussed above. After step 802, the current adapter in step 803 erases any adapter identifier codes that it has placed on subparts of the shared resource 155 during operation in the SOLO mode. Next, in step 804 the current adapter converts the data in its lock table to DUAL mode compatible data. This is done to ensure compatibility with the DUAL mode. Specifically, step 712 involves reconfiguring the current adapter's lock table to show the "REMOTE" state for all address ranges listed in the other adapter's lock table as being "LOCAL." This information is available to both adapters as a result of the lock table data exchange of steps 612, 614, 616 (FIG. 6).

After step 804, the current adapter begins operation in the DUAL mode (step 806), and also changes its state announcement message to heartbeat (step 807). The heartbeat message advises the other adapter that the current adapter, and the intervening communications links, are operational. DUAL mode operation (step 808) may be implemented using known techniques, such as the following:

1. the known "two phase commit" process;
2. known "semaphore" technology, as exemplified by (1) E. W. Dijkstra, "Solution of the Problem in Concurrent Programming Control," Comm. of the ACM, Vol. 8, No. 9, (1965), p. 569, and (2) E. W. Dijkstra, "Cooperating Sequential Processes," Programming Languages (ed. F. Geunys, Academic Press), (1968), p. 43–112;
3. IBM's "consensus protocol" technology, e.g., U.S. application Ser. No. 08/972,111, "Method and Apparatus for Ordered Reliable Multicast With Asymmetric Safety in a Multiprocessing System"; or
4. another protocol that guarantees mutual exclusion and consensus among competitors as to access privileges.

Instead of known techniques, step 806 may be implemented using a novel process, such as the disclosures of U.S. patent application Ser. No. 09/203,101, entitled "Method For Managing Concurrent Processes Using Dual Locking," filed herewith in the names of R. Freitas et al., and presently assigned to IBM. The foregoing application, in its entirety, is incorporated herein by reference.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for managing access to a shared resource in a multiprocessing system, the shared resource having multiple subparts, the system including two processors each coupled to the shared resource and one or more hosts, each processing having an associated lock table to show lock ownership of the subparts, the method comprising:

each processor repeatedly sending a state announcement message to the other processor, the state announcement message having a content representing the sending processor's state;

in response to predetermined join-entry conditions applying to a subject one of the processors, the subject processor performing a JOIN operation to choose an operating mode for the subject processor, the JOIN operation comprising:

exchanging any information needed to synchronize the processors' lock tables;

if the subject processor's lock table requires information from the other processor's lock table, the subject processor establishing content of its announcement message as a birth cry message;

if the attempted exchange of information succeeds, the subject processor choosing to operate in a DUAL mode;

if the attempted exchange of information fails, the subject processor choosing to operate in a SOLO mode;

after a processor completes the JOIN operation, the processor operating in its chosen mode;

where operation of a subject processor in the DUAL mode comprises:

the subject establishing content of its announcement message as a heartbeat message;

the subject processor cooperating with the other processor to temporarily establish single-processor locks on subparts of the shared resource as needed to satisfy host requests to access the shared resource; and in response to an indication of failure of the other processor, the subject processor beginning operation in the SOLO mode;

where operation of a subject processor in the SOLO mode comprises:

the subject processor establishing content of its announcement message as a death knell message;

the subject processor attempting to acquire the subparts of the shared resource by attempting to store a predetermined code at each subpart; and in response to the subject processor receiving host requests to access subparts of the shared resource, only if the subparts are acquired proceeding to access the shared resource to the exclusion of the other processor without consulting the other processor.

2. The method of claim 1, where the predetermined join-entry conditions comprise:

receipt of a birth cry message from the other processor, receipt of a heartbeat message from the other processor while the subject processor is operating in the SOLO mode, and receipt of a death knell message from the other processor.

3. The method of claim 1, the predetermined join-entry conditions also include power-up of the processor.

4. The method of claim 1, where the indications of failure of the other processor include:

failure of the subject processor to receive a heartbeat message from the other processor.

5. The method of claim 1, where the indications of failure of the other processor include:

failure of the JOIN operation to complete within a predetermined time.

6. The method of claim 1, the shared resource comprising a digital data storage.

7. The method of claim 1, where each processor is embodied by a separate digital data processing machine.

8. The method of claim 1, where each processor is embodied by a separate software process.

9. The method of claim 1, where the operation of attempting to store a predetermined code at each subpart is performed atomically for each subpart.

10. The method of claim 1, where:

each subpart of the shared storage region includes a code-storage-region; and the operation of the subject processor attempting to store a predetermined code at each subpart comprises, for each subpart, atomic operations of:

the subject processor reading contents of the subpart's code-storage-region, and only if the region does not already contain a predetermined code, the subject processor writing the predetermined code therein.

11. The method of claim 1, where:

each subpart of the shared storage region includes a code-storage-region;

each of the processors has a different processor identifier code; and the operation of the subject processor attempting to store a predetermined code at each subpart comprises, for each subpart, atomic operations of:

the subject processor reading contents of the subpart's code-storage-region, and only if the region does not already contain any processor's identifier code, writing the subject processor's identifier code therein.

12. The method of claim 1, where responsive to a subject processor receiving a death knell message from the other processor while the subject processor is operating in the DUAL mode, the subject processor commences the JOIN operation, where:

the information needed to synchronize the lock tables is information from the other processor's lock table; and the subject processor establishes content of its state announcement message as a birth cry message.

13. The method of claim 1, where responsive to a subject processor receiving a birth cry message from the other processor while the subject processor is operating in the DUAL mode, the subject processor commences the JOIN operation, where:

the attempted exchange involves the subject processor sending information from the subject processor's lock table to the other processor.

14. The method of claim 1, where responsive to a subject processor receiving a birth cry message from the other processor while the subject processor is operating in the DUAL mode, the subject processor remains in the DUAL mode.

15. The method of claim 1, where responsive to a subject processor receiving a heartbeat message from the other processor while the subject processor is operating in the SOLO mode, the subject processor commences the JOIN operation, where:

the information needed to synchronize the lock tables is information from the other processor's lock table; and the subject processor establishes content of its state announcement message as a birth cry message.

16. The method of claim 1, where responsive to a subject processor receiving a heartbeat message from the other processor while the subject processor is operating in the SOLO mode, the subject processor commences operation in the DUAL mode.

17. The method of claim 1, where responsive to a subject processor receiving a death knell message from the other processor while the subject processor is operating in the SOLO mode, the subject processor commences the JOIN operation, where:

the information needed to synchronize the lock tables includes a mutual exchange of information from both processors' lock tables.

18. The method of claim 1, where responsive to a subject processor receiving a birth cry message from the other processor while the subject processor is operating in the SOLO mode, the subject processor commences the JOIN operation, where:

the attempted exchange involves the subject processor sending information from the subject processor's lock table to the other processor.

19. A signal-bearing medium tangibly embodying a program of machine-readable instructions executable by a digital processing apparatus to perform operations to manage access to a shared resource in a multiprocessing system, the shared resource having a multiple subparts, the system including two processors each coupled to the shared resource and one or more hosts, each processing having an associated lock table to show lock ownership of the subparts, the operations comprising:

each processor repeatedly sending a state announcement message to the other processor, the state announcement message having a content representing the sending processor's state;

in response to predetermined join-entry conditions applying to a subject one of the processors, the subject processor performing a JOIN operation to choose an operating mode for the subject processor, the JOIN operation comprising:

exchanging any information needed to synchronize the processors' lock tables;

if the subject processor's lock table requires information from the other processor's lock table, the subject processor establishing content of its announcement message as a birth cry message;

if the attempted exchange of information succeeds, the subject processor choosing to operate in a DUAL mode;

if the attempted exchange of information fails, the subject processor choosing to operate in a SOLO mode;

after a processor completes the JOIN operation, the processor operating in its chosen mode;

where operation of a subject processor in the DUAL mode comprises:

the subject establishing content of its announcement message as a heartbeat message;

the subject processor cooperating with the other processor to temporarily establish single-processor locks on subparts of the shared resource as needed to satisfy host requests to access the shared resource; and in response to an indication of failure of the other processor, the subject processor beginning operation in the SOLO mode;

where operation of a subject processor in the SOLO mode comprises:

the subject processor establishing content of its announcement message as a death knell message;

the subject processor attempting to acquire the subparts of the shared resource by attempting to store a predetermined code at each subpart; and in response to the subject processor receiving host requests to access subparts of the shared resource, only if the subparts are acquired proceeding to access the shared resource to the exclusion of the other processor without consulting the other processor.

20. The medium of claim 19, where the predetermined join-entry conditions comprise:

receipt of a birth cry message from the other processor, receipt of a heartbeat message from the other processor while the subject processor is operating in the SOLO mode, and receipt of a death knell message from the other processor.

21. The medium of claim 19, the predetermined join-entry conditions also include power-up of the processor.

22. The medium of claim 19, where the indications of failure of the other processor include:

failure of the subject processor to receive a heartbeat message from the other processor.

23. The medium of claim 19, where the indications of failure of the other processor include:

failure of the JOIN operation to complete within a predetermined time.

24. The medium of claim 19, the shared resource comprising a digital data storage.

25. The medium of claim 19, where each processor is embodied by a separate digital data processing machine.

26. The medium of claim 19, where each processor is embodied by a separate software process.

27. The medium of claim 19, where the operation of attempting to store a predetermined code at each subpart is performed atomically for each subpart.

28. The medium of claim 19, where:

each subpart of the shared storage region includes a code-storage-region; and the operation of the subject processor attempting to store a predetermined code at each subpart comprises, for each subpart, atomic operations of:

the subject processor reading contents of the subpart's code-storage-region, and only if the region does not already contain a predetermined code, the subject processor writing the predetermined code therein.

29. The medium of claim 19, where:

each subpart of the shared storage region includes a code-storage-region;

each of the processors has a different processor identifier code; and the operation of the subject processor attempting to store a predetermined code at each subpart comprises, for each subpart, atomic operations of:

the subject processor reading contents of the subpart's code-storage-region, and only if the region does not already contain any processor's identifier code, writing the subject processor's identifier code therein.

30. The medium of claim 19, where responsive to a subject processor receiving a death knell message from the other processor while the subject processor is operating in the DUAL mode, the subject processor commences the JOIN operation, where:

the information needed to synchronize the lock tables is information from the other processor's lock table; and the subject processor establishes content of its state announcement message as a birth cry message.

31. The medium of claim 19, where responsive to a subject processor receiving a birth cry message from the other processor while the subject processor is operating in the DUAL mode, the subject processor commences the JOIN operation, where:

the attempted exchange involves the subject processor sending information from the subject processor's lock table to the other processor.

32. The medium of claim 19, where responsive to a subject processor receiving a birth cry message from the other processor while the subject processor is operating in the DUAL mode, the subject processor remains in the DUAL mode.

33. The medium of claim 19, where responsive to a subject processor receiving a heartbeat message from the other processor while the subject processor is operating in the SOLO mode, the subject processor commences the JOIN operation, where:

the information needed to synchronize the lock tables is information from the other processor's lock table; and the subject processor establishes content of its state announcement message as a birth cry message.

34. The medium of claim 19, where responsive to a subject processor receiving a heartbeat message from the other processor while the subject processor is operating in the SOLO mode, the subject processor commences operation in the DUAL mode.

35. The medium of claim 19, where responsive to a subject processor receiving a death knell message from the other processor while the subject processor is operating in the SOLO mode, the subject processor commences the JOIN operation, where:

the information needed to synchronize the lock tables includes a mutual exchange of information from both processors' lock tables.

36. The medium of claim 19, where responsive to a subject processor receiving a birth cry message from the other processor while the subject processor is operating in the SOLO mode, the subject processor commences the JOIN operation, where:

the attempted exchange involves the subject processor sending information from the subject processor's lock table to the other processor.

37. A digital data processing system, comprising:

a shared resource having multiple subparts; and at least two processors each coupled to the shared resource and one or more hosts, each processing having an associated lock table to show lock ownership of the subparts;

each processor being programmed to perform operations to manage access to the shared resource, the operations comprising:

each processor repeatedly sending a state announcement message to the other processor, the state announcement message having a content representing the sending processor's state;

in response to predetermined join-entry conditions applying to a subject one of the processors, the subject processor performing a JOIN operation to choose an operating mode for the subject processor, the JOIN operation comprising:

exchanging any information needed to synchronize the processors' lock tables;

if the subject processor's lock table requires information from the other processor's lock table, the subject processor establishing content of its announcement message as a birth cry message;

if the attempted exchange of information succeeds, the subject processor choosing to operate in a DUAL mode;

if the attempted exchange of information fails, the subject processor choosing to operate in a SOLO mode;

after a processor completes the JOIN operation, the processor operating in its chosen mode;

where operation of a subject processor in the DUAL mode comprises:

the subject establishing content of its announcement message as a heartbeat message;

the subject processor cooperating with the other processor to temporarily establish single-processor locks on subparts of the shared resource as needed to satisfy host requests to access the shared resource; and in response to an indication of failure of the other processor, the subject processor beginning operation in the SOLO mode;

where operation of a subject processor in the SOLO mode comprises:

the subject processor establishing content of its announcement message as a death knell message;

the subject processor attempting to acquire the subparts of the shared resource by attempting to store a predetermined code at each subpart; and in response to the subject processor receiving host requests to access subparts of the shared resource, only if the subparts are acquired proceeding to access the shared resource to the exclusion of the other processor without consulting the other processor.

38. The system of claim 37, where the predetermined join-entry conditions comprise:

receipt of a birth cry message from the other processor, receipt of a heartbeat message from the other processor while the subject processor is operating in the SOLO mode, and receipt of a death knell message from the other processor.

39. The system of claim 37, the predetermined join-entry conditions also include power-up of the processor.

40. The system of claim 37, where the indications of failure of the other processor include:

failure of the subject processor to receive a heartbeat message from the other processor.

41. The system of claim 37, where the indications of failure of the other processor include:

failure of the JOIN operation to complete within a predetermined time.

42. The system of claim 37, the shared resource comprising a digital data storage.

43. The system of claim 37, where each processor is embodied by a separate digital data processing machine.

44. The system of claim 37, where each processor is embodied by a separate software process.

45. The system of claim 37, where the operation of attempting to store a predetermined code at each subpart is performed atomically for each subpart.

46. The system of claim 37, where:

each subpart of the shared storage region includes a code-storage-region; and the operation of the subject processor attempting to store a predetermined code at each subpart comprises, for each subpart, atomic operations of:

the subject processor reading contents of the subpart's code-storage-region, and only if the region does not already contain a predetermined code, the subject processor writing the predetermined code therein.

47. The system of claim 37, where:

each subpart of the shared storage region includes a code-storage-region;

each of the processors has a different processor identifier code; and the operation of the subject processor attempting to store a predetermined code at each subpart comprises, for each subpart, atomic operations of:

the subject processor reading contents of the subpart's code-storage-region, and only if the region does not already contain any processor's identifier code, writing the subject processor's identifier code therein.

48. The system of claim 37, where responsive to a subject processor receiving a death knell message from the other processor while the subject processor is operating in the DUAL mode, the subject processor commences the JOIN operation, where:

the information needed to synchronize the lock tables is information from the other processor's lock table; and the subject processor establishes content of its state announcement message as a birth cry message.

49. The system of claim 37, where responsive to a subject processor receiving a birth cry message from the other processor while the subject processor is operating in the DUAL mode, the subject processor commences the JOIN operation, where:

the attempted exchange involves the subject processor sending information from the subject processor's lock table to the other processor.

50. The system of claim 37, where responsive to a subject processor receiving a birth cry message from the other processor while the subject processor is operating in the DUAL mode, the subject processor remains in the DUAL mode.

51. The system of claim 37, where responsive to a subject processor receiving a heartbeat message from the other processor while the subject processor is operating in the SOLO mode, the subject processor commences the JOIN operation, where:

the information needed to synchronize the lock tables is information from the other processor's lock table; and the subject processor establishes content of its state announcement message as a birth cry message.

52. The system of claim 37, where responsive to a subject processor receiving a heartbeat message from the other processor while the subject processor is operating in the SOLO mode, the subject processor commences operation in the DUAL mode.

53. The system of claim 37, where responsive to a subject processor receiving a death knell message from the other processor while the subject processor is operating in the SOLO mode, the subject processor commences the JOIN operation, where:

the information needed to synchronize the lock tables includes a mutual exchange of information from both processors' lock tables.

54. The system of claim 37, where responsive to a subject processor receiving a birth cry message from the other processor while the subject processor is operating in the SOLO mode, the subject processor commences the JOIN operation, where:

the attempted exchange involves the subject processor sending information from the subject processor's lock table to the other processor.

* * * * *